US012518425B2

(12) United States Patent
Kakita et al.

(10) Patent No.: US 12,518,425 B2
(45) Date of Patent: Jan. 6, 2026

(54) INFORMATION PROCESSING DEVICE, INFORMATION PROCESSING METHOD, AND COMPUTER READABLE MEDIUM

(71) Applicant: DENSO TEN Limited, Hyogo (JP)

(72) Inventors: Naoshi Kakita, Kobe (JP); Koji Ohnishi, Kobe (JP); Takayuki Ozasa, Kobe (JP)

(73) Assignee: DENSO TEN Limited, Kobe (JP)

( * ) Notice: Subject to any disclaimer, the term of this patent is extended or adjusted under 35 U.S.C. 154(b) by 364 days.

(21) Appl. No.: 18/186,630

(22) Filed: Mar. 20, 2023

(65) Prior Publication Data
US 2024/0062420 A1 Feb. 22, 2024

(30) Foreign Application Priority Data
Aug. 19, 2022 (JP) ................. 2022-130990

(51) Int. Cl.
*G06T 7/80* (2017.01)
*G06T 7/246* (2017.01)
(Continued)

(52) U.S. Cl.
CPC ............... *G06T 7/80* (2017.01); *G06T 7/246* (2017.01); *G06T 7/70* (2017.01); *H04N 17/002* (2013.01);
(Continued)

(58) Field of Classification Search
CPC ....... G06T 2207/30244; G06T 7/70–85; G06T 2207/30252; G06T 2207/30264; G06V 20/56; G06V 20/588
See application file for complete search history.

(56) References Cited

U.S. PATENT DOCUMENTS

| 2015/0288878 A1* | 10/2015 | Bae ........................... G06T 7/73 348/169 |
| 2020/0082568 A1* | 3/2020 | Hayakawa ................ G06T 7/70 |
| 2021/0192787 A1* | 6/2021 | Jung ..................... G06V 20/20 |

FOREIGN PATENT DOCUMENTS

| CN | 103718213 A * | 4/2014 | ............... G06T 7/80 |
| JP | 2013168057 A * | 8/2013 | |

(Continued)

OTHER PUBLICATIONS

Anna Heinemann, Camera Based Object Position Estimation for Mobile Devices, Sep. 9, 2013 (Year: 2013).*
(Continued)

Primary Examiner — Andrew W Bee
Assistant Examiner — Caleb L Esquino
(74) Attorney, Agent, or Firm — Oliff PLC

(57) ABSTRACT

An information processing device includes: a controller configured to execute a posture estimation processing by estimating a posture of an in-vehicle camera based on an optical flow of a feature point in a processing target region set in a camera image captured by the in-vehicle camera. The controller is configured to set a position of the processing target region in a vertical direction based on a horizontal line position which is a position of a horizontal line derived from a point where two parallel lines intersect with each other in a real space observed in the camera image, an attachment height of the in-vehicle camera, and a horizontal line deviation amount which is a deviation amount between the horizontal line position and an optical axis center of the in-vehicle camera.

12 Claims, 9 Drawing Sheets

(51) Int. Cl.
  *G06T 7/70* (2017.01)
  *H04N 17/00* (2006.01)

(52) U.S. Cl.
  CPC .............. *G06T 2207/20092* (2013.01); *G06T 2207/30244* (2013.01); *G06T 2207/30252* (2013.01)

(56) References Cited

FOREIGN PATENT DOCUMENTS

| JP | 2018165912 A | * | 10/2018 | ............... B60R 1/00 |
| JP | 2020201766 A | * | 12/2020 | |
| JP | 2021-086258 A | | 6/2021 | |
| WO | WO-2020090320 A1 | * | 5/2020 | |

OTHER PUBLICATIONS

Yilun Chen, Learning On-Road Visual Control for Self-Driving Vehicles with Auxiliary Tasks, Dec. 19, 2018 (Year: 2018).*
Sanghyun Son, Design and Implementation of Real-Time Vehicular Camera for Driver Assistance and Traffic Congestion Estimation, Aug. 18, 2015 (Year: 2015).*
Sresthasa Mohanty, Autonomous Vehicle Utilizing Deep Learning Methods, 2024 (Year: 2024).*
Jinming Su, "Structure Guided Lane Detection", Jun. 2021 (Year: 2021).*
"Artoolkit Overview"; URL:http://im-lab.net/artoolkit-overview/; (online), Keio University, (retrieved on Jul. 25, 2022).

* cited by examiner

# INFORMATION PROCESSING DEVICE, INFORMATION PROCESSING METHOD, AND COMPUTER READABLE MEDIUM

CROSS-REFERENCE TO RELATED APPLICATIONS

This application is based on and claims priorities under 35 USC 119 from Japanese Patent Application No. 2022-130990 filed on Aug. 19, 2022, the content of which is incorporated herein by reference.

TECHNICAL FIELD

A disclosed embodiment relates to an information processing device, an information processing method, and a computer readable medium storing a program.

BACKGROUND ART

An attachment position and a posture of an in-vehicle camera may change due to unexpected contact, aging, or the like, and may be deviated from a calibration result at the beginning of attachment. In order to detect this deviation, a technique of estimating a posture of an in-vehicle camera based on a camera image captured by the in-vehicle camera has been known in the related art.

For example, JP2021-086258A discloses a technique of extracting a feature point on a road surface from a rectangular region of interest (ROI; processing target region) set in a camera image and estimating a posture of an in-vehicle camera based on an optical flow indicating a motion of the feature point between frames.

By extracting a pair of parallel line segments in a real space based on such an optical flow and using, for example, an algorithm disclosed in a website of Keio University ((online), Keio University, (retrieved on Jun. 30, 2022), the Internet URL: http://im-lab.net/artoolkit-overview/), a posture (rotation angles of axes of PAN, TILT, and ROLL) of the in-vehicle camera is estimated.

SUMMARY

There is room in the related art described above for further improvement in appropriately setting a processing target region for posture estimation of an in-vehicle camera.

In a case of posture estimation using an optical flow, it is desirable to set a ROI in a distance range of 5 m to 15 m in front of a camera position of an own car.

Unfortunately, depending on, for example, a type of a vehicle, attachment conditions of an in-vehicle camera such as an attachment height and a manner in which a vehicle body appears in a camera image are different. Therefore, an appearance of the above distance range in the camera image is also different depending on the type of a vehicle and the like. It is currently difficult to set a ROI suitable for posture estimation only based on a camera image while absorbing such a difference in appearance.

An aspect of an embodiment has been made in view of the above, and an object thereof is to provide an information processing device, an information processing method, and a computer readable medium storing a program capable of appropriately setting a processing target region for posture estimation of an in-vehicle camera.

An information processing device according to an aspect of an embodiment includes a controller. The controller executes a posture estimation processing by estimating a posture of an in-vehicle camera based on an optical flow of a feature point in a processing target region set in a camera image captured by the in-vehicle camera. The controller sets a position of the processing target region in a vertical direction based on a horizontal line position which is a position of a horizontal line derived from a point where two parallel lines intersect with each other in a real space observed in the camera image, an attachment height of the in-vehicle camera, and a horizontal line deviation amount which is a deviation amount between the horizontal line position and an optical axis center of the in-vehicle camera.

According to an aspect of an embodiment, it may be possible to appropriately set a processing target region for posture estimation of an in-vehicle camera.

DESCRIPTION OF EMBODIMENTS

Hereinafter, embodiments of an information processing device, an information processing method, and a program disclosed in the present application will be described in detail with reference to the accompanying drawings. The present invention is not limited to the embodiments described below.

Hereinafter, a case where the information processing device according to an embodiment is an in-vehicle device 10 (see FIG. 7) to be mounted on a vehicle will be described as an example. The in-vehicle device 10 is, for example, a drive recorder. Hereinafter, it is assumed that the information processing method according to an embodiment is a posture estimation method of a camera 11 (see FIG. 7) included in the in-vehicle device 10. In the following descriptions, it is assumed that a ROI has a rectangular shape. In addition, in the following description, when referred to "longitudinal" for a camera image, a longitudinal direction corresponds to an upper-lower direction of the camera image, that is, a vertical direction. Similarly, when referred to "lateral", a lateral direction corresponds to a left-right direction of the camera image, that is, a horizontal direction.

First Embodiment

First, contents of a posture estimation method according to a first embodiment will be described with reference to FIGS. 1 to 6. FIGS. 1 to 6 are diagrams (part 1) to (part 6) illustrating the posture estimation method according to the first embodiment.

In a case where a posture of the camera 11 is estimated based on an optical flow of a feature point on a road surface, an extracted feature point on the road surface may be a corner portion of a road marking such as a crosswalk or a lane.

Figure 1:
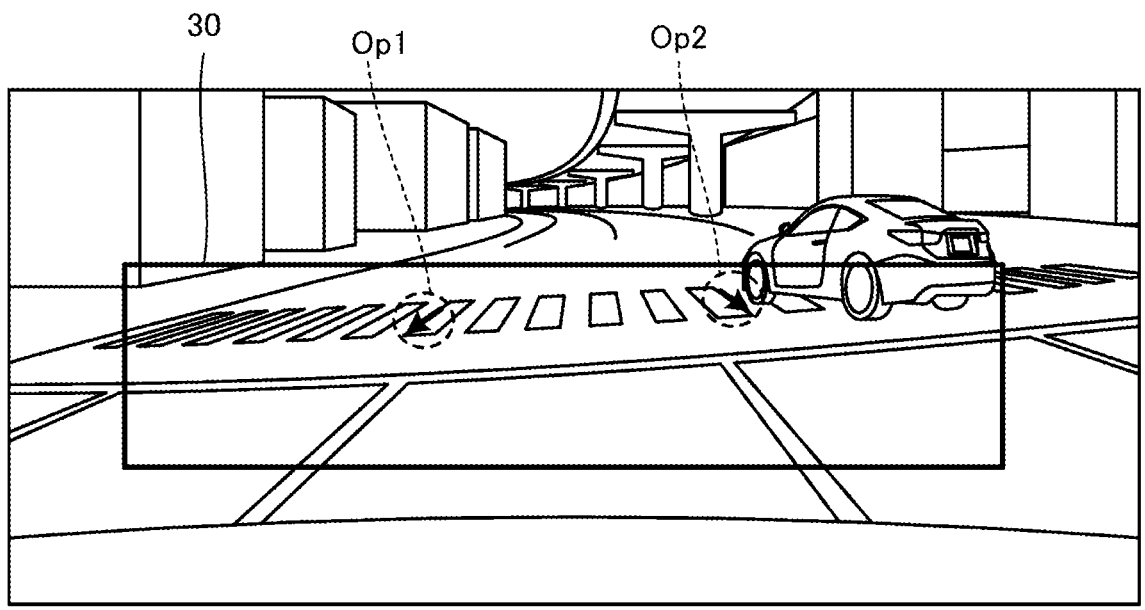
FIG. 1 is a diagram (part 1) illustrating a posture estimation method according to a first embodiment.

FIG. 1 shows an example in which optical flows Op1 and Op2 are extracted based on the corner portion of the crosswalk in a ROI 30.

The algorithm disclosed in the website of Keio University ((online), Keio University, (retrieved on Jun. 30, 2022), the Internet URL: http://im-lab.net/artoolkit-overview/) is based on a pair of parallel line segments in a real space, and the pair of optical flows Op1 and Op2 in FIG. 1 is a correct combination (hereinafter referred to as a "correct flow") for posture estimation. On the other hand, in the ROI 30, many optical flows including a case of not being parallel to the optical flows Op1 and Op2 are extracted in addition to the optical flows Op1 and Op2.

Therefore, in these optical flows, a pair which is an erroneous combination (hereinafter, referred to as an "erroneous flow") with respect to the above correct flow occurs. Based on this erroneous flow, the posture of the camera 11 cannot be correctly estimated.

Therefore, in posture estimation processing of the camera 11, rotation angles of axes of PAN, TILT, and ROLL are estimated for each of the pair of the extracted optical flows, and an axial deviation of the camera 11 is statistically determined based on a median value in a histogram.

Figure 2:
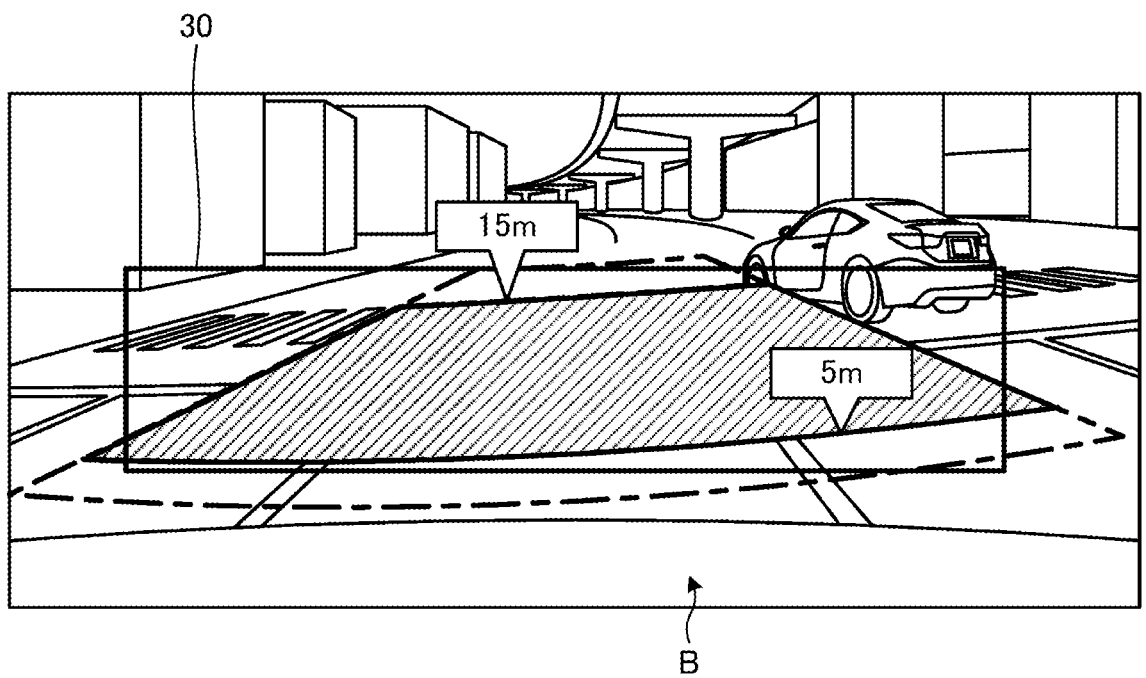
FIG. 2 is a diagram (part 2) illustrating the posture estimation method according to the first embodiment.

As shown in FIG. 2, in the posture estimation processing using the optical flows, it is desirable that the ROI 30 has a longitudinal size including a distance range of 5 m to 15 m in front of the camera 11 at least in the longitudinal direction.

Similarly, as shown in FIG. 2, it is desirable that in the lateral direction, the ROI 30 has a lateral size of about 7.2 m in total of a width of 3.5 m of an own vehicle traveling lane and a half (1.75 m×2) of a width of each of traveling lanes adjacent to the own vehicle traveling lane as a range in which a large amount of three-dimensional objects such as lateral vehicles and walls do not appear.

However, for example, attachment conditions of the camera 11 such as an attachment height and a manner in which a vehicle body appears in a camera image are different depending on a difference in a type of the vehicle. Therefore, an appearance of the distance range of 5 m to 15 m in the camera image is also different depending on the difference in the type of the vehicle and the like. It is currently difficult to set a ROI suitable for posture estimation only based on a camera image while absorbing such a difference in appearance.

Therefore, in the posture estimation method according to the first embodiment, a control unit 15 (see FIG. 7) included in the in-vehicle device 10 executes posture estimation processing of estimating a posture of the camera 11 based on an optical flow of a feature point in a processing target region set in a camera image of the camera 11, and sets a position of the processing target region in the vertical direction based on a horizontal line position which is a position of a horizontal line derived from a point where two parallel lines intersect with each other in a real space observed in the camera image, an attachment height of the camera 11, and a horizontal line deviation amount which is a deviation amount between the horizontal line position and an optical axis center of the camera 11.

Figure 3:
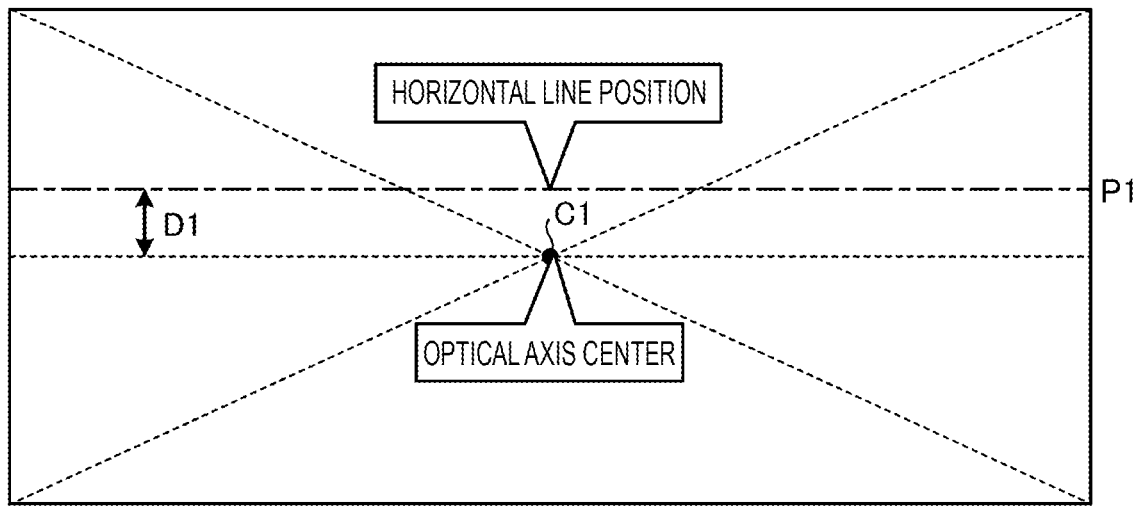
FIG. 3 is a diagram (part 3) illustrating the posture estimation method according to the first embodiment.

Specifically, as shown in FIG. 3, the control unit 15 first acquires a camera image captured by the camera 11, and calculates a horizontal line deviation amount D1 which is a deviation amount between a horizontal line position P1 and an optical axis center C1 of the camera 11.

The horizontal line position P1 indicates a longitudinal position (position in the vertical direction), on the camera image, of a horizontal line passing through a point where two different lines (for example, two lanes) observed as two lines parallel in a real space but not parallel in the camera image intersect with each other. The intersection point corresponds to a "vanishing point" of a so-called perspective, and includes, for example, any point where two lanes can be regarded as substantially intersecting.

The horizontal line position P1 is set by an attachment operator or a user, for example, at the time of attaching or calibrating the camera 11. Alternatively, the horizontal line position P1 is set based on an image recognition result of the camera image.

Figure 4:
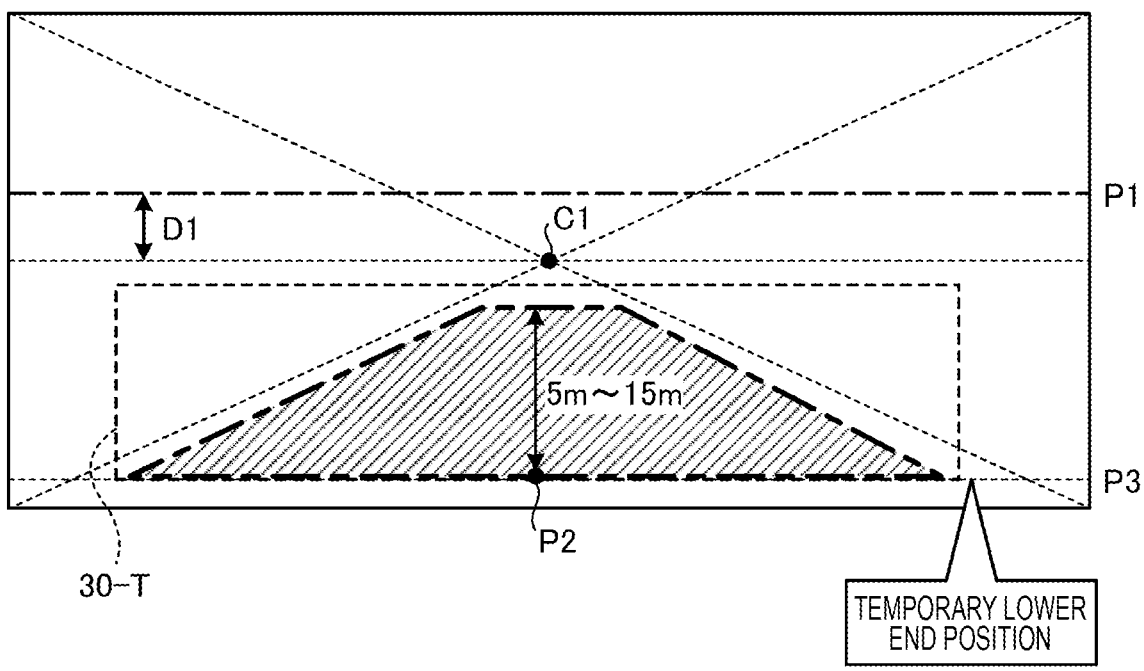
FIG. 4 is a diagram (part 4) illustrating the posture estimation method according to the first embodiment.

Subsequently, as shown in FIG. 4, the control unit 15 sets the calculated horizontal line deviation amount D1 as a simple TILT angle, and calculates a 5 m position P2 from the camera 11 in the camera image based on the TILT angle and the attachment height of the camera 11. At this time, the control unit 15 may calculate the 5 m position P2 using, for example, a coordinate conversion formula between a camera coordinate system and a road surface coordinate system, or may derive the 5 m position P2 using a preset coordinate conversion table or the like.

The attachment height is set by a user including an attachment operator, for example, at the time of attaching the camera 11. Alternatively, the attachment height is set based on the image recognition result of the camera image.

Then, the control unit 15 temporarily sets a ROI 30-T having the calculated 5 m position P2 as a temporary lower end position (hereinafter referred to as a "temporary lower end position P3"). At this time, the control unit 15 sets a longitudinal size of the ROI 30-T so as to include the distance range of 5 m to 15 m in front of the camera 11 from the temporary lower end position P3. The lateral size is set so as to include the above width range of about 7.2 m. That is, the control unit 15 sets the size of the ROI 30-T so as to include a trapezoidal region (see a region filled by oblique lines in FIG. 4), which is also shown in FIG. 2.

Figure 5:
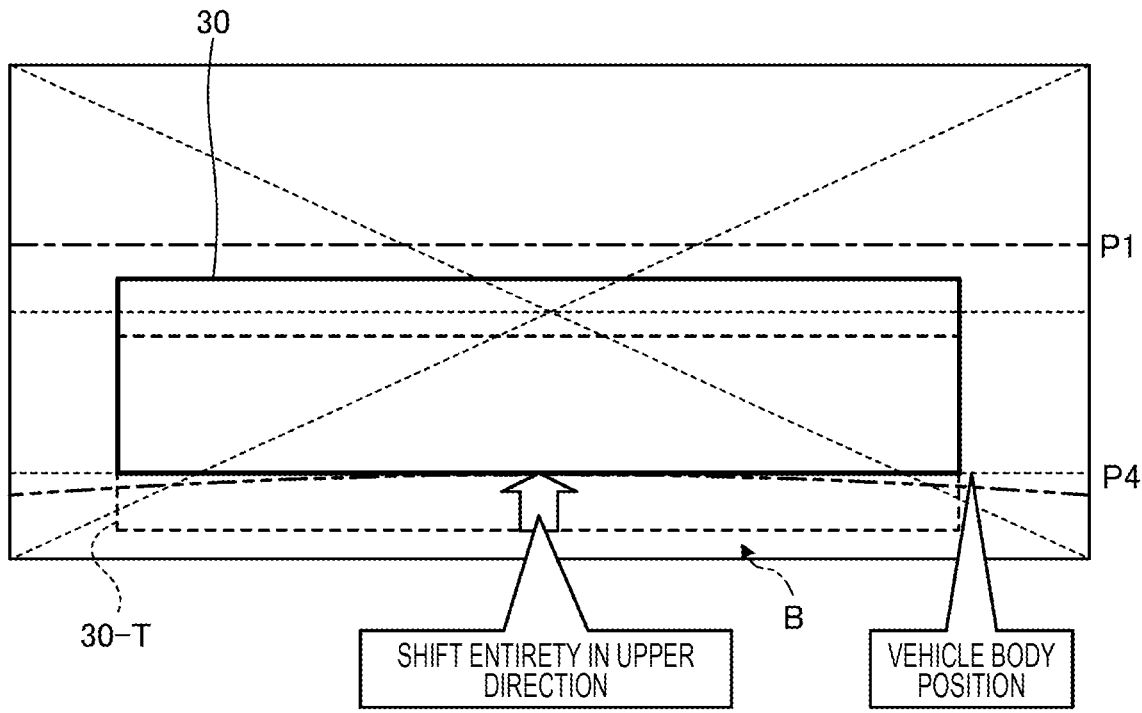
FIG. 5 is a diagram (part 5) illustrating the posture estimation method according to the first embodiment.

Then, as shown in FIG. 5, when the ROI 30-T overlaps an appearing portion (region indicated by a two-dot chain line) of the vehicle body such as a bonnet B in the camera image, the control unit 15 shifts the entire ROI 30-T in the upper direction. In other words, when the vehicle body position P4 exceeds the lower end position (that is, the temporary lower end position P3 described above) of the ROI 30-T, the control unit 15 corrects the position of the ROI 30-T by shifting the entire ROI 30-T in the upper direction so that the lower end position of the ROI 30-T is located above the vehicle body position P4 in the longitudinal direction.

The vehicle body position P4 is the most protruding position of the vehicle body portion appearing in the camera image. Similarly to the horizontal line position P1, the vehicle body position P4 is set by a user including an attachment operator, for example, at the time of attaching or calibrating the camera 11. Alternatively, the vehicle body position P4 is set based on the image recognition result of the camera image.

Figure 6:
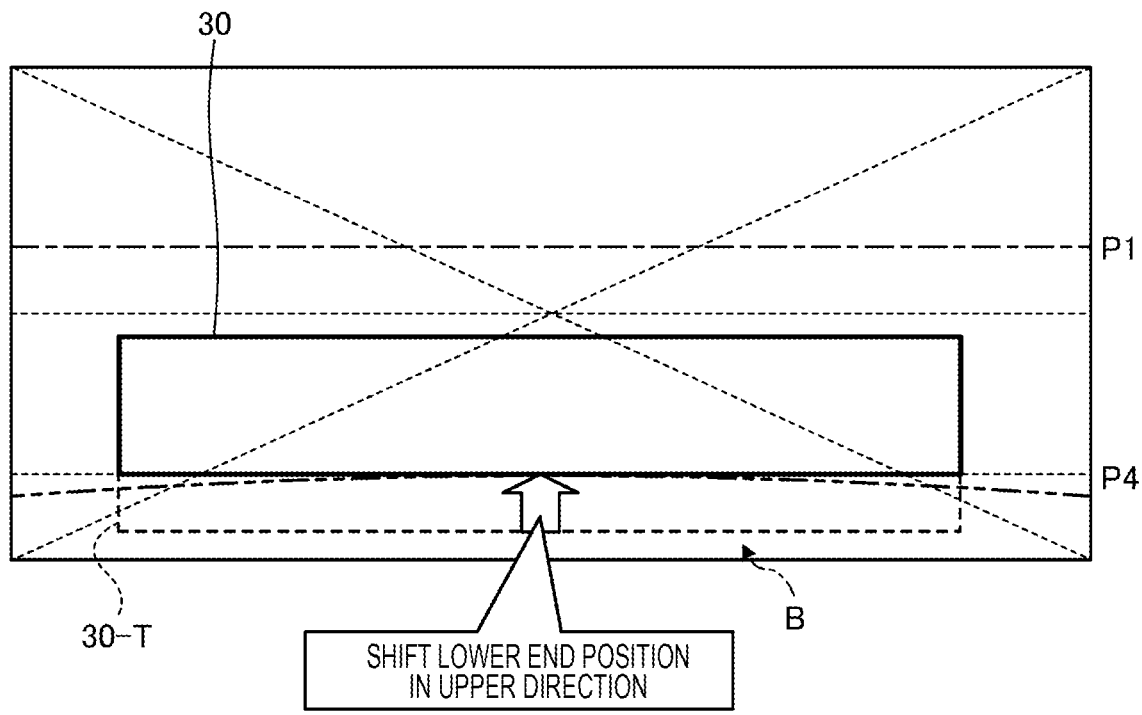
FIG. 6 is a diagram (part 6) illustrating the posture estimation method according to the first embodiment.

When the ROI 30-T overlaps the appearing portion of the vehicle body, the control unit 15 may shift the lower end position of the ROI 30-T in the upper direction as shown in FIG. 6. In other words, when the vehicle body position P4 exceeds the temporary lower end position P3, the control unit 15 may correct (here, reduce) the longitudinal size of the ROI 30-T such that the lower end position of the ROI 30-T is located above the vehicle body position P4 in the longitudinal direction.

Then, the control unit 15 sets the ROI 30-T of which the position and/or the size is corrected as necessary as the final ROI 30. Then, the control unit 15 executes the posture estimation processing with the set ROI 30 as a processing target.

In this way, in the posture estimation method according to the first embodiment, the control unit 15 of the in-vehicle device 10 executes posture estimation processing of estimating a posture of the camera 11 based on an optical flow of a feature point in a processing target region set in a camera image of the camera 11, and sets a position of the processing target region in the vertical direction based on a horizontal line position which is a position of a horizontal line derived from a point where two parallel lines intersect with each other in a real space observed in the camera image, an attachment height of the camera 11, and a horizontal line deviation amount which is a deviation amount between the horizontal line position and an optical axis center of the camera 11.

Therefore, according to the posture estimation method according to the first embodiment, it is possible to appropriately set a processing target region for posture estimation of the camera 11.

Figure 7:
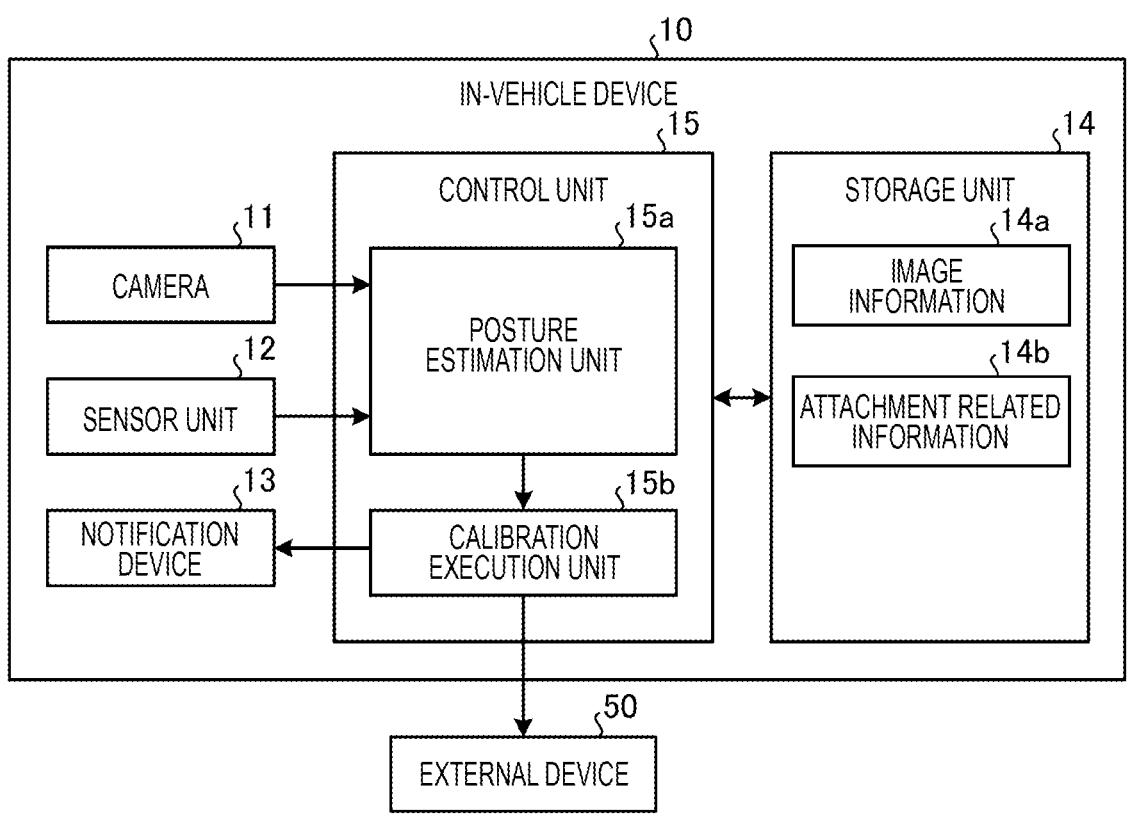
FIG. 7 is a block diagram showing a configuration example of an in-vehicle device according to the first embodiment.
Figure 8:
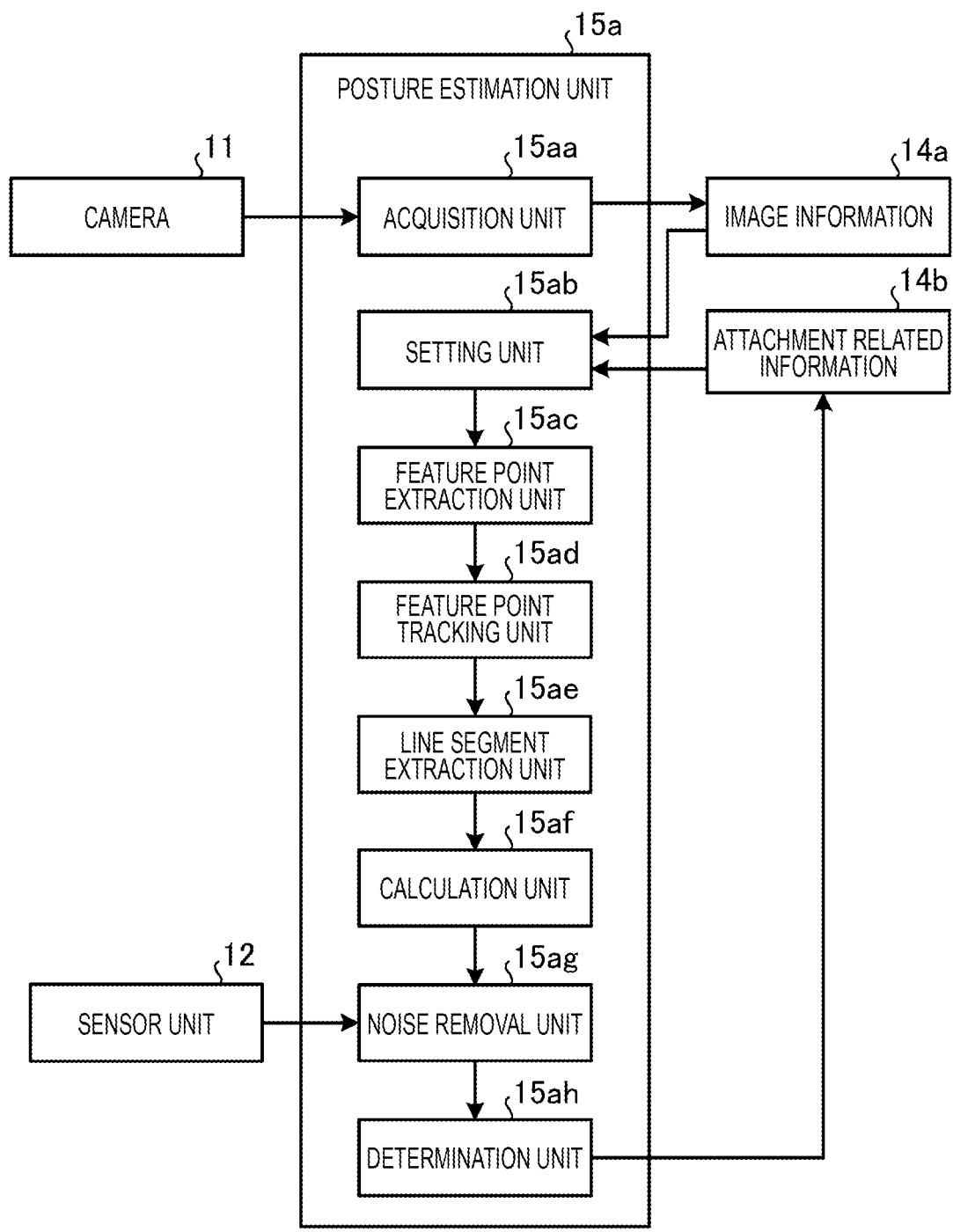
FIG. 8 is a block diagram showing a configuration example of a posture estimation unit.

Next, a configuration example of the in-vehicle device 10 will be described. FIG. 7 is a block diagram showing a configuration example of the in-vehicle device 10 according to the first embodiment. FIG. 8 is a block diagram showing a configuration example of a posture estimation unit 15a. In FIGS. 7 and 8, only components necessary for describing the features of the present embodiment are shown, and description of general components is omitted.

In other words, each component shown in FIGS. 7 and 8 is a functional concept, and is not necessarily physically configured as shown. For example, specific forms of distribution and integration of the blocks are not limited to those shown in the drawings, and all or part of the blocks may be functionally or physically distributed or integrated in any unit depending on various loads or use conditions.

In the descriptions with reference to FIGS. 7 and 8, the description of the components already described may be simplified or omitted.

As shown in FIG. 7, the in-vehicle device 10 according to the embodiment includes the camera 11, a sensor unit 12, a notification device 13, a storage unit 14, and the control unit 15.

The camera 11 includes an imaging element such as a charge coupled device (CCD) or a complementary metal oxide semiconductor (CMOS), and captures a predetermined imaging range using the imaging element. The camera 11 is attached to various portions of the vehicle such as a windshield and a dashboard so as to capture a predetermined imaging range in front of the vehicle.

The sensor unit 12 is various sensors to be mounted on the vehicle, including, for example, a vehicle speed sensor and a G sensor. The notification device 13 is a device that notifies information related to calibration. The notification device 13 is implemented by, for example, a display, a speaker, or the like.

The storage unit 14 is implemented by a storage device such as a random access memory (RAM) or a flash memory. In the example of FIG. 7, the storage unit 14 stores image information 14a and attachment related information 14b.

The image information 14a stores a camera image captured by the camera 11. The attachment related information 14b is information related to attachment of the camera 11.

The attachment related information 14b includes design values and calibration values related to the attachment position and the posture of the camera 11. The attachment position of the camera 11 includes the attachment height of the camera 11.

The attachment related information 14b includes the horizontal line position P1, the vehicle body position P4, and the like used in setting processing of the ROI 30 executed by the setting unit 15ab to be described later.

The attachment related information 14b includes various parameters such as camera parameters and threshold values used in posture estimation processing executed by the posture estimation unit 15a to be described later.

The control unit 15 is a controller, and is implemented by a central processing unit (CPU), a micro processing unit (MPU), or the like executing a program (not shown) according to the first embodiment stored in the storage unit 14 using a RAM as a work area. The control unit 15 may be implemented by an integrated circuit such as an application specific integrated circuit (ASIC) or a field programmable gate array (FPGA).

The control unit 15 includes the posture estimation unit 15a and a calibration execution unit 15b, and implements or executes a function or an effect of information processing to be described below.

The posture estimation unit 15a sets the ROI 30 based on the attachment height of the camera 11, the horizontal line deviation amount D1, and the vehicle body position P4, and executes posture estimation processing using an optical flow in the set ROI 30.

A configuration example of the posture estimation unit 15a will be described more specifically with reference to FIG. 8. As shown in FIG. 8, the posture estimation unit 15a includes an acquisition unit 15aa, the setting unit 15ab, a feature point extraction unit 15ac, a feature point tracking unit 15ad, a line segment extraction unit 15ae, a calculation unit 15af, a noise removal unit 15ag, and a determination unit 15ah.

The acquisition unit 15aa acquires a captured image by the camera 11 and stores the captured image in the image information 14a. The setting unit 15ab executes the setting processing of setting the ROI 30 to be processed in the posture estimation for the camera 11 with respect to the camera image stored in image information 14a.

The setting unit 15ab calculates the horizontal line deviation amount D1 which is a deviation amount between the horizontal line position P1 and the optical axis center C1. The setting unit 15ab sets the calculated horizontal line deviation amount D1 as a simple TILT angle and calculates the 5 m position P2 from the camera 11 based on the TILT angle and the attachment height of the camera 11.

The setting unit 15ab temporarily sets the ROI 30-T having the calculated 5 m position P2 as the temporary lower end position P3. At this time, the setting unit 15ab sets a longitudinal size of the ROI 30-T so as to include a distance range of 5 m to 15 m in front of the camera 11 from the temporary lower end position P3. The lateral size is set so as to include the above width range of about 7.2 m.

When the vehicle body position P4 exceeds the temporary lower end position P3 and the ROI 30-T overlaps the appearing portion of the vehicle body, the setting unit 15ab corrects the position of the ROI 30-T by shifting the entire ROI 30-T in the upper direction so that the lower end position of the ROI 30-T is located above the vehicle body position P4 in the longitudinal direction. When the vehicle body position P4 is the temporary lower end position P3 or lower, the setting unit 15ab does not correct the position of the ROI 30-T.

Alternatively, when the vehicle body position P4 exceeds the temporary lower end position P3 and the ROI 30-T overlaps the appearing portion of the vehicle body, the setting unit 15ab corrects the longitudinal size of the ROI 30-T by shifting the lower end position of the ROI 30-T in the upper direction so that the lower end position of the ROI 30-T is located above the vehicle body position P4 in the longitudinal direction. When the vehicle body position P4 is the temporary lower end position P3 or lower, the setting unit 15ab does not correct the longitudinal size of the ROI 30-T.

Then, the setting unit 15ab sets the ROI 30-T including a case where the position and/or the size is corrected as necessary as the final ROI 30. The setting unit 15ab outputs a set content of the set ROI 30 to the feature point extraction unit 15ac.

The feature point extraction unit 15ac extracts feature points in the ROI 30 set by the setting unit 15ab.

The feature point tracking unit 15ad tracks each feature point extracted by the feature point extraction unit 15ac between frames, and extracts an optical flow for each feature point. The line segment extraction unit 15ae removes a noise component from the optical flow extracted by the feature point tracking unit 15ad, and extracts a pair group of line segments based on each optical flow.

The calculation unit 15af calculates rotation angles of axes of PAN, TILT, and ROLL for each of the pair of line segments extracted by the line segment extraction unit 15ae using the algorithm disclosed in the website of Keio University ((online), Keio University, (retrieved on Jun. 30, 2022), the Internet URL: http.//im-lab.net/artoolkit-overview/).

The noise removal unit 15ag removes noise due to the low speed and the steering angle from each angle calculated by the calculation unit 15af based on a sensor value of the sensor unit 12. The determination unit 15ah creates a histogram of each angle from which the noise component is removed, and determines angle estimation values of PAN, TILT, and ROLL based on the median value. The determination unit 15ah stores the determined angle estimation value in the attachment related information 14b.

The description returns to FIG. 7. The calibration execution unit 15b executes calibration based on an estimation result by the posture estimation unit 15a. Specifically, the calibration execution unit 15b compares the angle estimation value estimated by the posture estimation unit 15a with the design value included in the attachment related information 14b, and calculates an error.

If the calculated error is allowable, the calibration execution unit 15b notifies an external device 50 of the calibration value. The external device 50 is a device that implements, for example, a parking frame detection function or an automatic parking function. The expression "the error is allowable" means that there is no axial deviation of the camera 11.

When the calculated error is not allowable, the calibration execution unit 15b notifies the external device 50 of the calibration value and causes the external device 50 to stop the parking frame detection function and the automatic parking function. The expression "the error is not allowable" means that there is an axial deviation of the camera 11.

The calibration execution unit 15b notifies the notification device 13 of a calibration execution result. A user is requested to adjust an attachment angle of the camera 11 at a dealer or the like, if necessary, based on the notification content.

Figure 9:
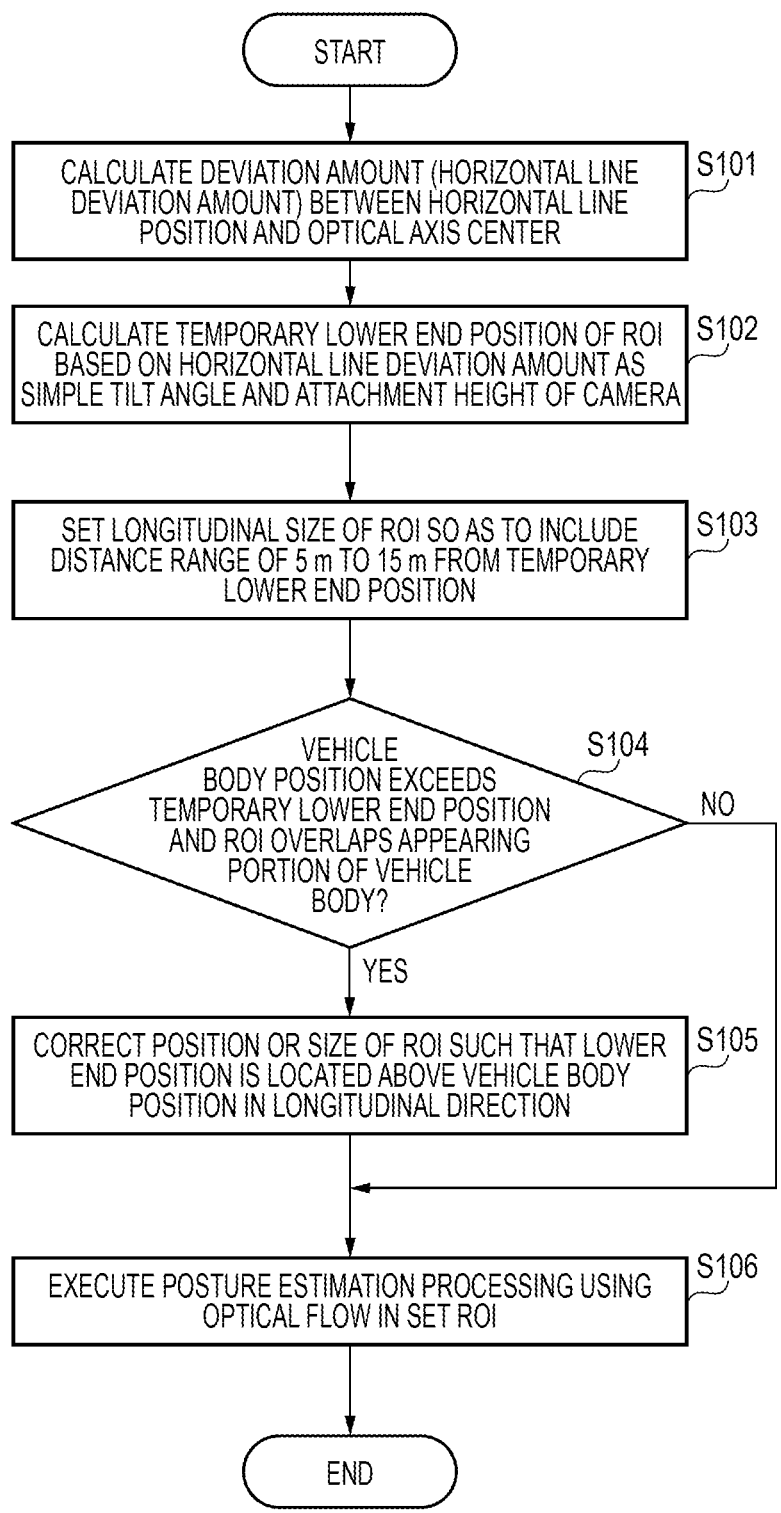
FIG. 9 is a flowchart showing a processing procedure executed by the in-vehicle device according to the first embodiment.

Next, a processing procedure executed by the in-vehicle device 10 according to the first embodiment will be described with reference to FIG. 9. FIG. 9 is a flowchart showing the processing procedure executed by the in-vehicle device 10 according to the first embodiment. FIG. 9 shows a processing procedure for one camera image. The processing procedure is repeated while the posture estimation processing is executed.

As shown in FIG. 9, the control unit 15 of the in-vehicle device 10 first acquires a camera image from the camera 11, and calculates the horizontal line deviation amount D1 which is a deviation amount between the horizontal line position P1 and the optical axis center C1 based on the acquired camera image (step S101).

Then, the control unit 15 sets the calculated horizontal line deviation amount D1 as a simple TILT angle, and calculates the temporary lower end position P3 of the ROI 30-T based on the TILT angle and the attachment height of the camera 11 (step S102).

Subsequently, the control unit 15 sets the longitudinal size of the ROI 30-T so as to include a distance range of 5 m to 15 m in front of the camera 11 from the calculated temporary lower end position P3 (step S103). Although not shown, the control unit 15 sets the lateral size to include the width range of about 7.2 m.

Then, the control unit 15 determines whether the vehicle body position P4 exceeds the temporary lower end position P3 and the ROI 30-T overlaps the appearing portion of the vehicle body (step S104). When the vehicle body position P4 exceeds the temporary lower end position P3 (Yes in step S104), the control unit 15 corrects the position or the size of the ROI 30-T such that the lower end position is located above the vehicle body position P4 in the longitudinal direction (step S105).

When the vehicle body position P4 is located below the temporary lower end position P3 in the longitudinal direction (No in step S104), the processing proceeds to step S106.

Then, the control unit 15 sets the ROI 30-T including the case where the position or the size is corrected as necessary in step S105 as the final ROI 30, and executes the posture estimation processing using the optical flow in the set ROI 30 (step S106). Then, the control unit 15 ends the processing for one camera image.

As described above, the in-vehicle device 10 (corresponding to an example of the "information processing device") according to the first embodiment includes the control unit 15 (corresponding to an example of the "controller"). The control unit 15 executes posture estimation processing of estimating a posture of the camera 11 based on an optical flow of a feature point in a processing target region set in a camera image of the camera 11 (corresponding to an example of the "in-vehicle camera"). The control unit 15 sets a position of the processing target region in the vertical direction based on the horizontal line position P1 which is a position of a horizontal line derived from a point where two parallel lines intersect with each other in a real space observed in the camera image, an attachment height of the camera 11, and the horizontal line deviation amount D1 which is a deviation amount between the horizontal line position P1 and the optical axis center of the camera 11.

Therefore, according to the in-vehicle device 10 according to the first embodiment, it is possible to appropriately set a processing target region for posture estimation of the camera 11.

The control unit 15 sets the horizontal line deviation amount D1 as the TILT angle of the camera 11, and calculates the lower end position of the processing target region based on the TILT angle and the attachment height.

Therefore, according to the in-vehicle device 10 according to the first embodiment, it is possible to easily set a processing target region by handling the horizontal line deviation amount D1 as a simple TILT angle.

When the processing target region set based on the lower end position overlaps the vehicle body portion appearing in the camera image, the control unit 15 corrects the position of the processing target region in the vertical direction such that the lower end position is located above the vehicle body position P4, which is the most protruding position of the vehicle body portion, in the longitudinal direction.

Therefore, according to the in-vehicle device 10 according to the first embodiment, the vehicle body portion appearing in the camera image can be excluded from the processing target region by position correction.

When the processing target region set based on the lower end position overlaps the vehicle body portion appearing in the camera image, the control unit 15 corrects the size of the processing target region in the vertical direction such that the lower end position is located above the vehicle body position P4, which is the most protruding position of the vehicle body portion, in the longitudinal direction.

Therefore, according to the in-vehicle device 10 according to the first embodiment, the vehicle body portion appearing in the camera image can be excluded from the processing target region by the size correction.

The horizontal line position P1, the vehicle body position P4, and the attachment height are set by the user.

Therefore, according to the in-vehicle device 10 according to the first embodiment, it is possible to easily set a processing target region based on user setting.

The control unit 15 sets at least one of the horizontal line position P1, the vehicle body position P4, and the attachment height based on the image recognition result of the camera image.

Therefore, according to the in-vehicle device 10 according to the first embodiment, it is possible to dynamically and accurately set at least one of the horizontal line position P1, the vehicle body position P4, and the attachment height.

The control unit 15 sets the size of the processing target region such that a predetermined distance range suitable for the posture estimation processing is included from the lower end position.

Therefore, according to the in-vehicle device 10 according to the first embodiment, it is possible to set the ROI 30 including the distance range of, for example, 5 m to 15 m in front of the camera 11 suitable for the posture estimation processing.

The posture estimation method according to the first embodiment is an information processing method executed by the in-vehicle device 10, and includes executing posture estimation processing of estimating a posture of the camera 11 based on an optical flow of a feature point in a processing target region set in a camera image of the camera 11, and setting a position of the processing target region in a vertical direction based on the horizontal line position P1 which is a position of a horizontal line derived from a point where two parallel lines intersect with each other in a real space observed in the camera image, an attachment height of the camera 11, and the horizontal line deviation amount D1 which is a deviation amount between the horizontal line position P1 and an optical axis center of the camera 11.

Therefore, according to the posture estimation method according to the first embodiment, it is possible to appropriately set a processing target region for posture estimation of the camera 11.

The program according to the first embodiment causes a computer to execute the following steps: executing posture estimation processing of estimating a posture of the camera 11 based on an optical flow of a feature point in a processing target region set in a camera image of the camera 11; and setting a position of the processing target region in a vertical direction based on the horizontal line position P1 which is a position of a horizontal line derived from a point where two parallel lines intersect with each other in a real space observed in the camera image, an attachment height of the camera 11, and the horizontal line deviation amount D1 which is a deviation amount between the horizontal line position P1 and an optical axis center of the camera 11.

Therefore, according to the program according to the first embodiment, it is possible to appropriately set a processing target region for posture estimation of the camera 11.

Second Embodiment

Next, a second embodiment will be described with reference to FIGS. 10 to 13. An in-vehicle device according to the second embodiment is referred to as an "in-vehicle device 10A". A configuration example of the in-vehicle device 10A is the same as that of FIGS. 7 and 8, but a mode of setting processing executed by the setting unit 15ab of the posture estimation unit 15a included in the control unit 15 is different. This difference will be mainly described below.

Figure 10:
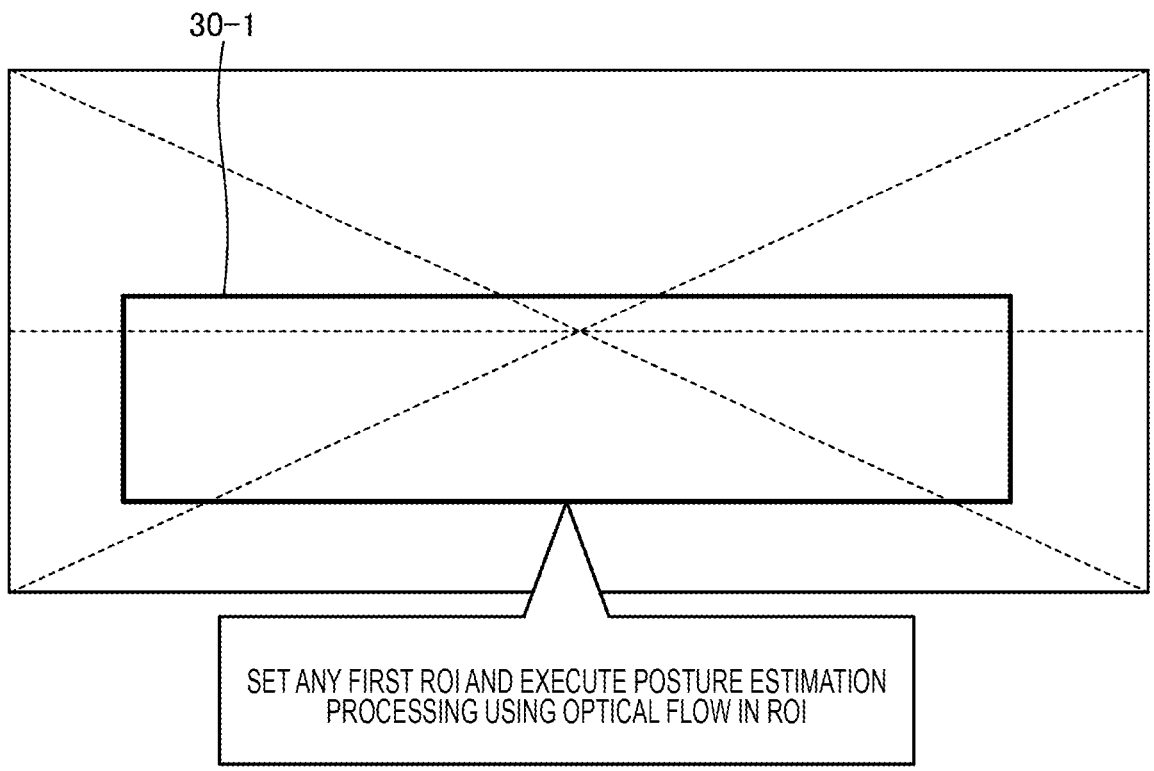
FIG. 10 is a diagram (part 1) showing a posture estimation method according to a second embodiment.
Figure 11:
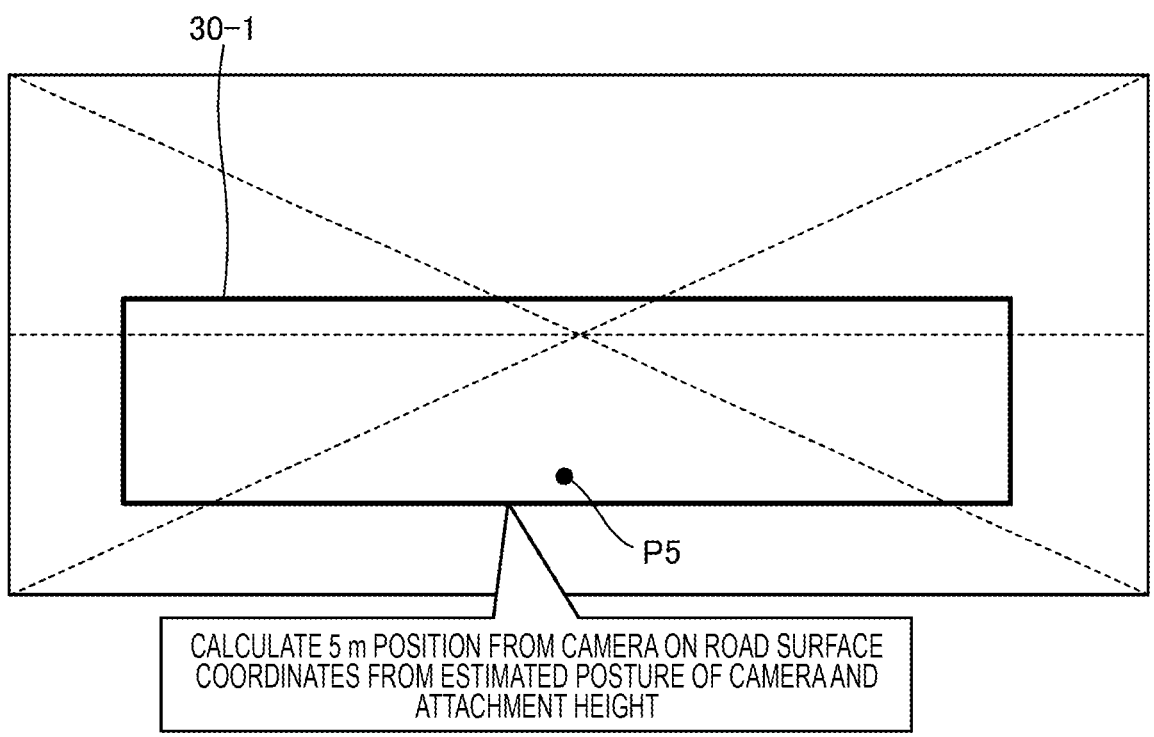
FIG. 11 is a diagram (part 2) showing the posture estimation method according to the second embodiment.
Figure 12:
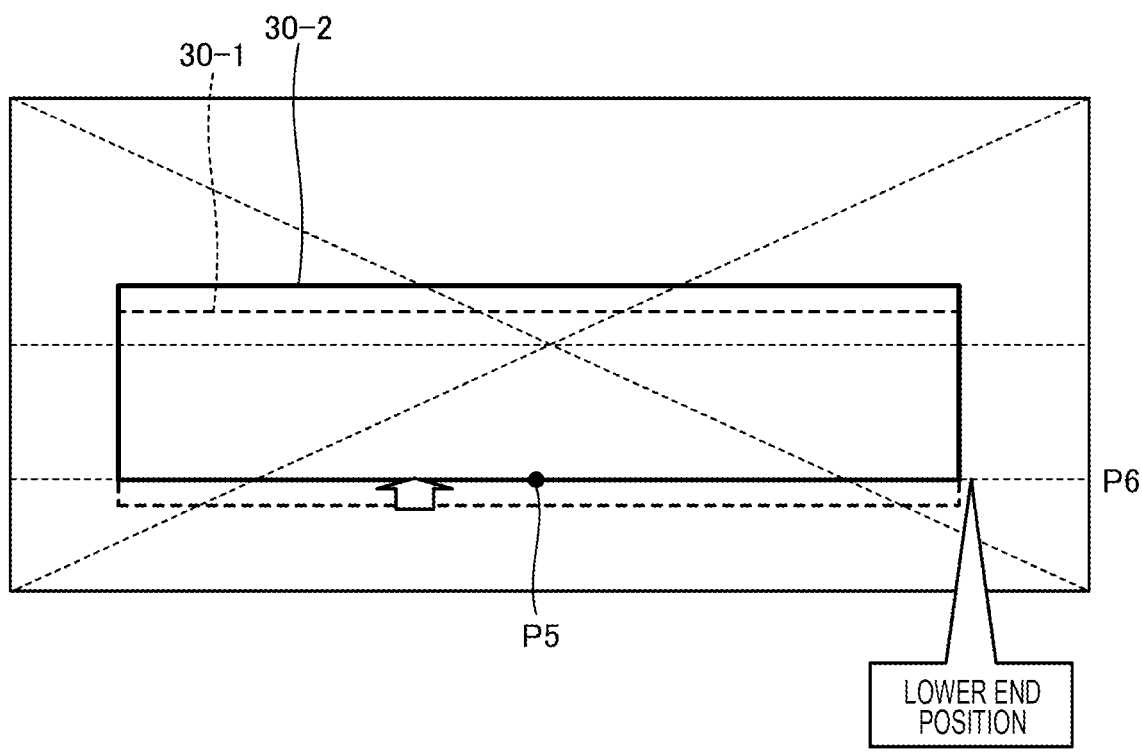
FIG. 12 is a diagram (part 3) showing the posture estimation method according to the second embodiment.
Figure 13:
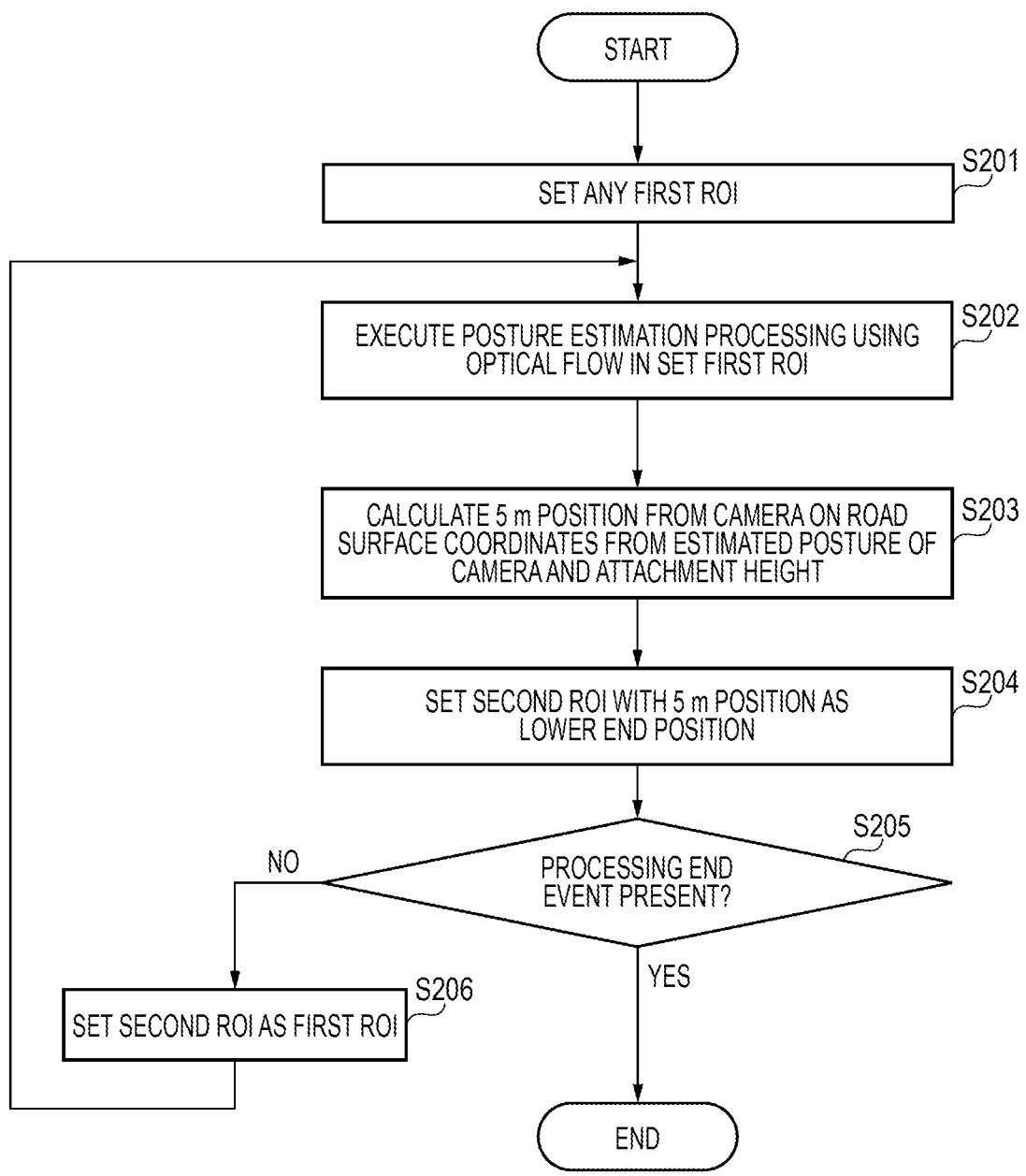
FIG. 13 is a flowchart showing a processing procedure executed by an in-vehicle device according to the second embodiment.

FIGS. 10 to 12 are diagrams (part 1) to (part 3) showing a posture estimation method according to the second embodiment. FIG. 13 is a flowchart showing a processing procedure executed by the in-vehicle device 10A according to the second embodiment.

In the second embodiment, the ROI 30 for posture estimation of the camera 11 is set with higher accuracy. In the first embodiment, the horizontal line deviation amount D1 is set as a simple TILT angle, and the 5 m position P2 from the camera 11 in a camera image is calculated based on the TILT angle and an attachment height of the camera 11.

On the other hand, in the second embodiment, any first ROI 30-1 in a camera image indicating at least a road surface is set, posture estimation processing using an optical flow in the first ROI 30-1 is executed, and a 5 m position P5 from the camera 11 in the camera image is calculated based on the posture of the camera 11 estimated by the posture estimation processing.

Specifically, as shown in FIG. 10, the control unit 15 of the in-vehicle device 10A sets any first ROI 30-1, and executes posture estimation processing using an optical flow in the first ROI 30-1. The first ROI 30-1 indicates at least the road surface in the camera image. As the first ROI 30-1, for example, the ROI 30 finally set in the first embodiment can be used.

As shown in FIG. 11, the control unit 15 of the in-vehicle device 10A calculates the 5 m position P5 from the camera 11 on road surface coordinates based on the posture of the camera 11 estimated by the posture estimation processing and the attachment height. The 5 m position P5 is based on a processing result of the posture estimation processing, and thus is more accurate than the above 5 m position P2.

As shown in FIG. 12, the control unit 15 of the in-vehicle device 10A sets a second ROI 30-2 in which a longitudinal position of the calculated 5 m position P5 is set as a lower end position P6.

Although not shown, in the second embodiment, as in the case of FIG. 5, when the ROI 30-2 overlaps the appearing portion of the vehicle body in the camera image, the entire ROI 30-2 may also be shifted in the upper direction. That is, when the vehicle body position P4 exceeds the lower end position P6 of the ROI 30-2 and the ROI 30-2 overlaps the appearing portion of the vehicle body, the control unit 15 of the in-vehicle device 10A may correct a position of the ROI 30-2 by shifting the entire ROI 30-2 in the upper direction such that the lower end position P6 is located above the vehicle body position P4 in the longitudinal direction.

In the second embodiment, as in the case shown in FIG. 6, when the ROI 30-2 overlaps the appearing portion of the vehicle body, the lower end position P6 of the ROI 30-2 may also be shifted in the upper direction. That is, when the vehicle body position P4 exceeds the lower end position P6 of the ROI 30-2 and the ROI 30-2 overlaps the appearing portion of the vehicle body, the control unit 15 of the in-vehicle device 10A may correct a longitudinal size of the ROI 30-2 such that the lower end position P6 is located above the vehicle body position P4 in the longitudinal direction.

Then, the control unit 15 of the in-vehicle device 10A sets the ROI 30-2 of which the position and/or the size is corrected as necessary as a new ROI 30-1. Then, the control unit 15 of the in-vehicle device 10A executes posture estimation processing with the new ROI 30-1 as a processing target.

Next, a processing procedure executed by the in-vehicle device 10A according to the second embodiment will be described. As shown in FIG. 13, the control unit 15 of the in-vehicle device 10A sets any first ROI 30-1 (step S201).

Then, the control unit 15 executes posture estimation processing using an optical flow in the set first ROI 30-1 (step S202).

Then, the control unit 15 calculates the 5 m position P5 from the camera 11 on the road surface coordinates from the posture of the camera 11 estimated in step S202 and the attachment height (step S203).

Then, the control unit 15 sets the second ROI 30-2 with the 5 m position P5 calculated in step S203 as the lower end position P6 (step S204).

Then, the control unit 15 determines whether there is a processing end event (step S205). The processing end event is, for example, arrival of a time period during which the posture estimation processing is not executed, stop of the engine, power-off, or the like.

When the processing end event does not occur (No in step S205), the control unit 15 sets the second ROI 30-2 as a new first ROI 30-1 (step S206), and repeats the processing from step S202. When the processing end event occurs (Yes in step S205), the control unit 15 ends the processing.

As described above, the in-vehicle device 10A (corresponding to an example of the "information processing device") according to the second embodiment includes the control unit 15 (corresponding to an example of the "controller"). The control unit 15 executes the posture estimation processing of estimating a posture of the camera 11 based on an optical flow of a feature point in the ROI 30-1 (corresponding to an example of the "first processing target region") set in a camera image of the camera 11 (corresponding to an example of the "in-vehicle camera"). The control unit 15 calculates the 5 m position P5 (corresponding to an example of a "distance position") on predetermined road surface coordinates in the camera image based on the posture of the camera 11 estimated by the posture estimation processing and the attachment height of the camera 11, and sets the ROI 30-2 (corresponding to an example of a "second processing target region") having the calculated 5 m position P5 as the lower end position P6 as a new ROI 30-1.

Therefore, according to the in-vehicle device 10A according to the second embodiment, it is possible to appropriately set a processing target region for posture estimation of the camera 11. A processing target region can be reset with high accuracy each time the posture estimation processing is executed.

When the ROI 30-2 set based on the lower end position P6 overlaps the vehicle body portion appearing in the camera image, the control unit 15 corrects a position of the ROI 30-2 in a vertical direction such that the lower end position P6 is located above the vehicle body position P4, which is the most protruding position of the vehicle body portion, in a longitudinal direction.

Therefore, according to the in-vehicle device 10A according to the second embodiment, a vehicle body portion appearing in a camera image can be excluded from a processing target region by position correction.

When the ROI 30-2 set based on the lower end position P6 overlaps the vehicle body portion appearing in the camera image, the control unit 15 corrects a size of the ROI 30-2 in the vertical direction such that the lower end position P6 is located above the vehicle body position P4, which is the most protruding position of the vehicle body portion, in the longitudinal direction.

Therefore, according to the in-vehicle device 10A according to the second embodiment, a vehicle body portion appearing in a camera image can be excluded from a processing target region by size correction.

The control unit 15 sets the size of the ROI 30-2 so as to include a predetermined distance range suitable for the posture estimation processing from the lower end position P6.

Therefore, according to the in-vehicle device 10A according to the second embodiment, it is possible to set the ROI 30 including a distance range of, for example, 5 m to 15 m in front of the camera 11 suitable for the posture estimation processing.

A posture estimation method according to the second embodiment is an information processing method executed by the in-vehicle device 10A, and includes executing posture estimation processing of estimating a posture of the camera 11 based on an optical flow of a feature point in the ROI 30-1 set in a camera image of the camera 11, calculating the 5 m position P5 on predetermined road surface coordinates in the camera image based on the posture of the camera 11 estimated by the posture estimation processing and an attachment height of the camera 11, and setting the ROI 30-2 having the calculated 5 m position P5 as the lower end position P6 as a new ROI 30-1.

Therefore, according to the posture estimation method according to the second embodiment, it is possible to appropriately set a processing target region for posture estimation of the camera 11. A processing target region can be reset with high accuracy each time the posture estimation processing is executed.

A program according to the second embodiment causes a computer to execute posture estimation processing of estimating a posture of the camera 11 based on an optical flow of a feature point in the ROI 30-1 set in a camera image of the camera 11, calculate the 5 m position P5 on predetermined road surface coordinates in the camera image based on the posture of the camera 11 estimated by the posture estimation processing and an attachment height of the camera 11, and to set the ROI 30-2 having the calculated 5 m position P5 as the lower end position P6 as a new ROI 30-1.

Therefore, according to the program according to the second embodiment, it is possible to appropriately set a processing target region for posture estimation of the camera 11. A processing target region can be reset with high accuracy each time the posture estimation processing is executed.

The programs according to the first embodiment and the second embodiment may be recorded in a computer-readable recording medium such as a hard disk, a flexible disk (FD), a CD-ROM, a magneto-optical disk (MO), a digital versatile disc (DVD), or a universal serial bus (USB) memory, and may be executed by being read from the recording medium by a computer. The recording medium is also an aspect of the present disclosure.

Additional effects and modifications can be easily derived by a person skilled in the art. Therefore, broader aspects of the present invention are not limited to the specific details and the representative embodiment shown and described above. Therefore, various modifications can be made without departing from the spirit or scope of the general inventive concept as defined by the appended claims and equivalents thereof.

What is claimed is:

1. An information processing device comprising:
a controller for executing a posture estimation processing to estimate a posture of an in-vehicle camera based on an optical flow of a feature point in a processing target region, the processing target region being set in a camera image that was captured by the in-vehicle camera, the controller configured to
set a position of a first processing target region in a vertical direction based on (i) a horizontal line position which is a position of a horizontal line extending through a vanishing point where two parallel lines that are parallel to each other in a real space but converge toward each other in the camera image intersect with each other in the camera image, (ii) a horizontal line deviation amount which is a deviation amount between the horizontal line position and an optical axis center of the in-vehicle camera, and (iii) an attachment height of the in-vehicle camera,
execute a first posture estimation processing based on an optical flow of a feature point in the first processing target region set in the camera image captured by the in-vehicle camera,
calculate a distance position on predetermined road surface coordinates in the camera image, based on a posture estimated by the first posture estimation processing and the attachment height of the in-vehicle camera,
set a second processing target region such that a lower end position of the second processing target region is located on the calculated distance position, and
execute a second posture estimation processing based on an optical flow of a feature point in the second processing target region.

2. The information processing device according to claim 1, wherein
the controller is configured to
set the horizontal line deviation amount as a TILT angle of the in-vehicle camera, and adjust the lower end position of the second processing target region based on the TILT angle and the attachment height.

3. The information processing device according to claim 1, wherein
the controller is configured to
adjust, in response to the lower end position of the second processing target region or the first processing target region overlapping a vehicle body portion appearing in the camera image, a position of the second processing target region or the first processing target region in the vertical direction such that the lower end position is located above a vehicle body position which is a most protruding position of the vehicle body portion in the vertical direction.

4. The information processing device according to claim 2, wherein
the controller is configured to
adjust, in response to the lower end of the second processing target region or the first processing target region overlapping a vehicle body portion appearing in the camera image, a size of the second processing target region or the first processing target region in the vertical direction such that the lower end position is located above a vehicle body position which is a most protruding position of the vehicle body portion in the vertical direction.

5. The information processing device according to claim 3, wherein
the horizontal line position, the vehicle body position, and the attachment height are set by a user.

6. The information processing device according to claim 4, wherein
the horizontal line position, the vehicle body position, and the attachment height are set by a user.

7. The information processing device according to claim 3, wherein
the controller is configured to
set at least one of the horizontal line position, the vehicle body position, and the attachment height based on an image recognition result of the camera image.

8. The information processing device according to claim 4, wherein
the controller is configured to
set at least one of the horizontal line position, the vehicle body position, and the attachment height based on an image recognition result of the camera image.

9. The information processing device according to claim 1, wherein
the controller is configured to
set a size of the second processing target region such that a predetermined distance range from the lower end position of the second processing target region suitable for the second posture estimation processing is included in the second processing target region.

10. An information processing method executed by an information processing device to execute a posture estimation processing to estimate a posture of an in-vehicle camera based on an optical flow of a feature point in a processing target region, the processing target region being set in a camera image that was captured by the in-vehicle camera, the method comprising:
setting a position of a first processing target region in a vertical direction based on (i) a horizontal line position which is a position of a horizontal line extending through a vanishing point where two parallel lines that are parallel to each other in a real space but converge toward each other in the camera image intersect with each other in the camera image, (ii) a horizontal line deviation amount which is a deviation amount between the horizontal line position and an optical axis center of the in-vehicle camera, and (iii) an attachment height of the in-vehicle camera;

executing a first posture estimation processing based on an optical flow of a feature point in the first processing target region set in the camera image captured by the in-vehicle camera;

calculating a distance position on predetermined road surface coordinates in the camera image, based on a posture estimated by the first posture estimation processing and the attachment height of the in-vehicle camera;

setting a second processing target region such that a lower end position of the second processing target region is located on the calculated distance position; and executing a second posture estimation processing based on an optical flow of a feature point in the second processing target region.

11. An information processing device comprising:
a controller for executing a posture estimation processing to estimate a posture of an in-vehicle camera based on an optical flow of a feature point in a camera image captured by the in-vehicle camera, the controller configured to execute a first posture estimation processing based on an optical flow of a feature point in a first processing target region set in advance in the camera image, set a second processing target region based on an attachment height of the in-vehicle camera and a posture estimated by the first posture estimation processing such that a lower end position of the second processing target region is located on a position that is spaced by a predetermined distance from a position of the in-vehicle camera on predetermined road surface coordinates, and execute a second posture estimation processing based on an optical flow of a feature point in the second processing target region.

12. The information processing device according to claim 11, wherein
the controller is configured to
set a position of the first processing target region in a vertical direction based on (i) a horizontal line position which is a position of a horizontal line extending through a vanishing point where two parallel lines that are parallel to each other in a real space but converge toward each other in the camera image intersect with each other in the camera image, (ii) a horizontal line deviation amount which is a deviation amount between the horizontal line position and an optical axis center of the in-vehicle camera, and (iii) the attachment height of the in-vehicle camera.

* * * * *